United States Patent
Kishiwada et al.

(10) Patent No.: US 10,218,961 B2
(45) Date of Patent: Feb. 26, 2019

(54) CALIBRATION METHOD, CALIBRATION DEVICE, AND COMPUTER PROGRAM PRODUCT

(71) Applicants: Jun Kishiwada, Kanagawa (JP); Shin Aoki, Kanagawa (JP); Naoki Kikuchi, Kanagawa (JP); Kagehiro Nagao, Kanagawa (JP)

(72) Inventors: Jun Kishiwada, Kanagawa (JP); Shin Aoki, Kanagawa (JP); Naoki Kikuchi, Kanagawa (JP); Kagehiro Nagao, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 126 days.

(21) Appl. No.: 15/123,998

(22) PCT Filed: Feb. 24, 2015

(86) PCT No.: PCT/JP2015/056016
§ 371 (c)(1),
(2) Date: Sep. 6, 2016

(87) PCT Pub. No.: WO2015/133414
PCT Pub. Date: Sep. 11, 2015

(65) Prior Publication Data
US 2017/0070725 A1    Mar. 9, 2017

(30) Foreign Application Priority Data
Mar. 7, 2014   (JP) ................................. 2014-045730

(51) Int. Cl.
*G06T 7/80*    (2017.01)
*H04N 13/246*  (2018.01)
(Continued)

(52) U.S. Cl.
CPC ........... *H04N 13/246* (2018.05); *B60R 11/04* (2013.01); *G06T 7/85* (2017.01); *H04N 13/239* (2018.05);
(Continued)

(58) Field of Classification Search
CPC .............................. H04N 13/0246; G06T 7/85
(Continued)

(56) References Cited

U.S. PATENT DOCUMENTS 5,446,536 A   8/1995  Miyake et al.
6,381,360 B1  4/2002  Sogawa
(Continued)

FOREIGN PATENT DOCUMENTS

DE   10 2007 040 232 A1   2/2009
JP       06-144006        5/1994
(Continued)

OTHER PUBLICATIONS

International Search Report dated May 26, 2015 in PCT/JP2015/056016 filed on Feb. 24, 2015.
(Continued)

*Primary Examiner* — Jeremiah C Hallenbeck-Huber
(74) *Attorney, Agent, or Firm* — Oblon, McClelland, Maier & Neustadt, L.L.P.

(57) ABSTRACT

A calibration method is for a photographic device that photographs an object through a transparent body. The calibration method includes: acquiring a first photographic image by photographing the object without interposing the transparent body; acquiring a second photographic image by photographing the object through the transparent body; calculating an absolute positional deviation that indicates a deviation in coordinates of an image of the object due to the transparent body based on coordinates of an image of the object on the first photographic image and coordinates of an
(Continued)

image of the object on the second photographic image; calculating a correction parameter for calibrating the absolute positional deviation; and storing the correction parameter in the photographic device.

9 Claims, 11 Drawing Sheets

(51) Int. Cl.
    *B60R 11/04*     (2006.01)
    *H04N 13/239*     (2018.01)

(52) U.S. Cl.
    CPC ............... *G06T 2207/10016* (2013.01); *G06T 2207/30208* (2013.01); *G06T 2207/30252* (2013.01)

(58) Field of Classification Search
    USPC .......................................................... 348/47
    See application file for complete search history.

(56) References Cited

U.S. PATENT DOCUMENTS

| | | |
|---|---|---|
| 7,423,673 B1 | 9/2008 | Efrat et al. |
| 8,957,963 B2* | 2/2015 | Almeida .............. H04N 17/002 348/135 |
| 2005/0219522 A1* | 10/2005 | Jones ..................... G01M 11/00 356/239.1 |
| 2007/0299596 A1* | 12/2007 | Moritz ..................... G06T 7/80 701/1 |
| 2009/0033926 A1* | 2/2009 | Haug ........................ G06T 7/80 356/243.1 |
| 2010/0283837 A1 | 11/2010 | Oohchida et al. |
| 2012/0002014 A1* | 1/2012 | Walsh ................... G06T 19/006 348/47 |
| 2012/0206601 A1 | 8/2012 | Seger et al. |
| 2013/0250065 A1 | 9/2013 | Aoki et al. |
| 2013/0250068 A1* | 9/2013 | Aoki ........................ G06T 7/85 348/47 |

FOREIGN PATENT DOCUMENTS

| | | |
|---|---|---|
| JP | 09-159442 | 6/1997 |
| JP | 2000-322565 | 11/2000 |
| JP | 4109077 | 4/2008 |
| JP | 2015-163866 | 9/2015 |

OTHER PUBLICATIONS

Extended European Search Report dated Mar. 29, 2017 in European Patent Application No. 15759240.3.

* cited by examiner

CALIBRATION METHOD, CALIBRATION DEVICE, AND COMPUTER PROGRAM PRODUCT

TECHNICAL FIELD

The present invention relates to a calibration method, a calibration device, and a computer program product.

BACKGROUND ART

Stereo cameras have been used that can measure the distance to an object. For example, techniques have been in practical use that control a vehicle by measuring the distance to an object existing in front of the vehicle by using a stereo camera (hereinafter referred to as an "in-vehicle stereo camera") mounted on the vehicle. The distance measured by using the in-vehicle stereo camera is used in alerting a driver and controlling the brake, steering, and/or the like for the purpose of preventing a crash of the vehicle, controlling the distance between vehicles, and others.

General in-vehicle stereo cameras are installed inside a windshield of a vehicle, because higher durability particularly in water resistance and dust resistance is required of an in-vehicle stereo camera installed outside a vehicle. A stereo camera installed inside a vehicle photographs views outside the vehicle through the windshield. General windshields, however, have a complexly curved shape, and the shape is distorted compared with optical parts such as a lens inside a camera. A windshield thus causes distortion on images photographed through the windshield.

Techniques to correct an image photographed by a stereo camera are conventionally known. For example, Japanese Patent No. 4109077 describes a device that transforms each of a pair of image data output from a pair of cameras constituting a stereo camera by using a calibration parameter based on a deviation in coordinates between one of the image data and the other image data and adjusts optical distortion and a positional deviation in the stereo camera through image processing.

Such conventional techniques can correctly calibrate a deviation (hereinafter referred to as a "relative positional deviation") in a parallax (a relative position) between object images on a pair of image data; however, those techniques cannot correctly calibrate a deviation (hereinafter referred to as an "absolute positional deviation") in coordinates of the object image on the image data due to a transparent body such as a windshield. This configuration problematically causes an error on three dimensional coordinates, which indicate the position of an object, when the three dimensional coordinates are calculated from the distance to the object calculated based on the parallax in the object image and from the coordinates of the object image on the image data.

In view of the above, there is a need to provide a calibration method, a calibration device, and a computer program product that can accurately calibrate an absolute positional deviation in image data due to a transparent body.

SUMMARY OF THE INVENTION

A calibration method is for a photographic device that photographs an object through a transparent body. The calibration method includes: acquiring a first photographic image by photographing the object without interposing the transparent body; acquiring a second photographic image by photographing the object through the transparent body; calculating an absolute positional deviation that indicates a deviation in coordinates of an image of the object due to the transparent body based on coordinates of an image of the object on the first photographic image and coordinates of an image of the object on the second photographic image; calculating a correction parameter for calibrating the absolute positional deviation; and storing the correction parameter in the photographic device.

A calibration device calibrates a photographic device that photographs an object through a transparent body. The calibration device includes: a receiving unit that receives a first photographic image obtained by photographing the object photographed without interposing the transparent body and a second photographic image obtained by photographing the object through the transparent body; an absolute positional deviation calculating unit that calculates an absolute positional deviation indicating a deviation in coordinates of an image of the object due to the transparent body based on coordinates of an image of the object on the first photographic image and coordinates of an image of the object on the second photographic image; a correction parameter calculating unit that calculates a correction parameter for calibrating the absolute positional deviation; and a memory control unit that stores the correction parameter in the photographic device.

A computer program product includes a non-transitory computer-readable medium having computer readable program codes. The program codes when executed cause a computer that calibrates a photographic device that photographs an object through a transparent body to perform: receiving a first photographic image obtained by photographing the object without interposing the transparent body and a second photographic image obtained by photographing the object through the transparent body; calculating an absolute positional deviation indicating a deviation in coordinates of an image of the object due to the transparent body based on coordinates of an image of the object on the first photographic image and coordinates of an image of the object on the second photographic image; calculating a correction parameter for calibrating the absolute positional deviation; and storing the correction parameter in the photographic device.

DESCRIPTION OF EMBODIMENTS

Embodiments of a calibration method, a calibration device, and a computer program product will be described in detail with reference to the accompanying drawings.

First Embodiment

Figure 1:
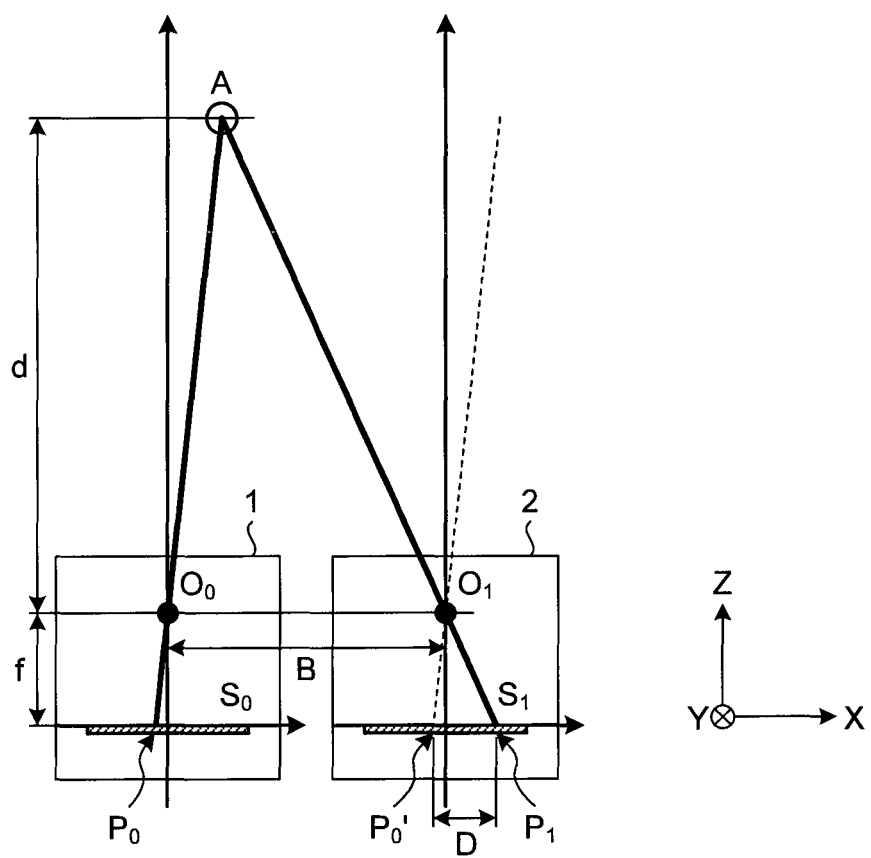
FIG. 1 is a drawing that illustrates a principle of measuring a distance using a stereo camera.

A first embodiment will be described with an example of the case where a photographic device to be calibrated is an in-vehicle stereo camera. Positional deviations in an image photographed by an in-vehicle stereo camera include an absolute positional deviation and a relative positional deviation. For description of the absolute positional deviation and the relative positional deviation, parallax and a principle of measuring a distance using the parallax will firstly be described. The parallax is calculated by using images photographed by a stereo camera. FIG. 1 is a drawing that illustrates a principle of measuring a distance using a stereo camera. In the example of FIG. 1, a first camera 1 (focal length f, an optical center $O_0$, an image capturing surface $S_0$) is arranged with the Z axis as the direction of an optical axis, and a second camera 2 (the focal length f, an optical center $O_1$, an image capturing surface $S_1$) is arranged with the Z axis as the direction of an optical axis. The first camera 1 and the second camera 2 are arranged parallel to the X axis and located in the position apart from each other by a distance B (baseline length).

An image of an object A located apart from the optical center $O_0$ of the first camera 1 by a distance d in the direction of the optical axis is formed at $P_0$ that is an intersection of the straight line A-$O_0$ and the image capturing surface $S_0$. With the second camera 2, an image of the same object A is formed at a position $P_1$ on the image capturing surface $S_1$. While a photographic image acquired from the image capturing surface $S_0$ is hereinafter referred to as a "comparison image", a photographic image acquired from the image capturing surface $S_1$ is referred to as a "reference image".

A point is defined as $P_0'$ where a straight line passing the optical center $O_1$ of the second camera 2 and parallel to the straight line A-$O_0$ intersects with the image capturing surface $S_1$. The distance between $P_0'$ and $P_1$ is defined as D. The distance D indicates the amount of a positional deviation (parallax) between images of the same object photographed by two cameras. The triangle A-$O_0$-$O_1$ and the triangle $O_1$-$P_0'$-$P_1$ are similar with each other, and the formula d=B×f/D is thus satisfied. In other words, the distance d to the object A can be worked out from the baseline length B, the focal length f, and the parallax D.

The above is the principle of measuring a distance using a stereo camera. In using a stereo camera photographing an object through a transparent body (such as an in-vehicle stereo camera photographing an object through a windshield), however, the transparent body causes a positional deviation (an absolute positional deviation described above) of the object image on the photographic image.

Figure 2A:
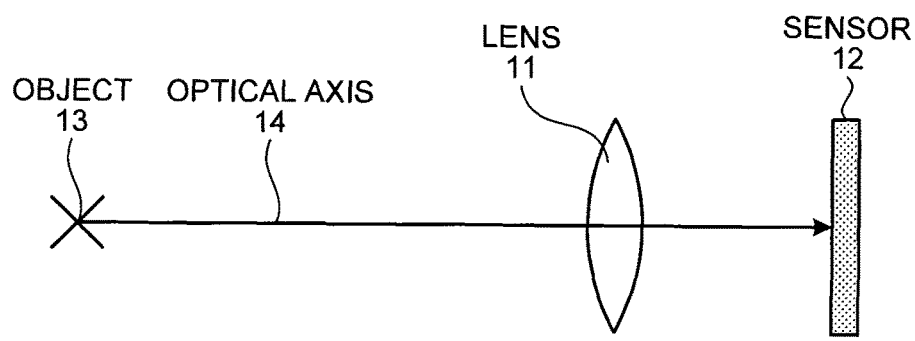
FIG. 2A is a drawing that illustrates an ideal detection position of an object image.

FIG. 2A is a drawing that illustrates an ideal detection position of an object image. In FIG. 2A, a lens 11 (an optical system) is described as a pinhole camera for convenience. If an object 13 exists on the optical axis of the lens 11, a light beam advances straight in the same direction as an optical axis 14 and reaches a position on a sensor 12. An image of the object 13 is thus detected in the position corresponding to a position of the optical axis.

Figure 2B:
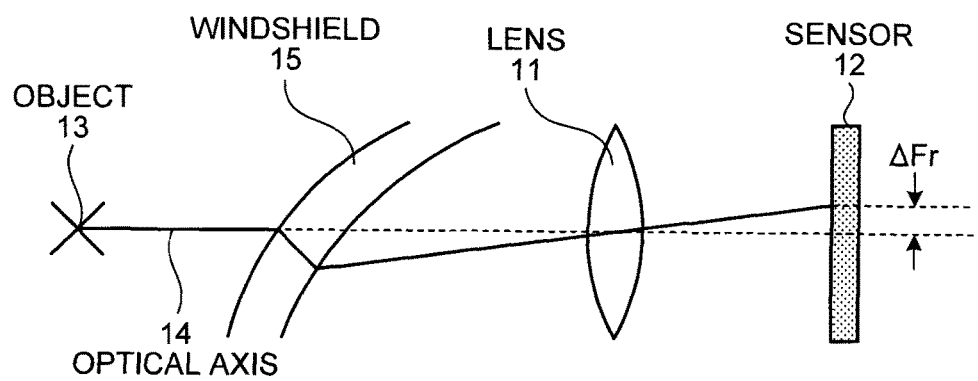
FIG. 2B is a drawing that illustrates a deviation in a detection position of the object image.

FIG. 2B is a drawing that illustrates a deviation in a detection position of the object image. FIG. 2B illustrates an example of the case where a windshield 15 is installed in front of the lens 11 of FIG. 2A. A light beam output from the object 13 is refracted at the front and the back surfaces of the windshield 15 and eventually reaches a position having a deviation of ΔFr from a position (see FIG. 2A) where the light beam reaches in the case of having no windshields. In other words, the image of the object 13 is detected at a position that differs by ΔFr from a position corresponding to the position of the optical axis.

The deviation ΔFr occurs in each of the two cameras constituting the stereo camera. The following is a description about why a deviation in a parallax (a relative positional deviation) in the object image can be calibrated to the correct parallax but a deviation (ΔFr as an absolute positional deviation) in coordinates of the object image cannot be calibrated when calibrating the image data based on the ideal parallax and the parallax obtained from a pair of image data acquired by the stereo camera.

FIGS. 3A to 3E are drawings for describing a principle of calibration in which a deviation in a parallax (the above-described relative positional deviation) in an object image can be calibrated to the correct parallax while a positional deviation (the above-described absolute positional deviation) in the object image cannot be calibrated to the correct position. The comparison images in FIGS. 3A to 3E are photographed by the first camera 1, and the reference images in FIGS. 3A to 3E are photographed by the second camera 2.

Figure 3A:
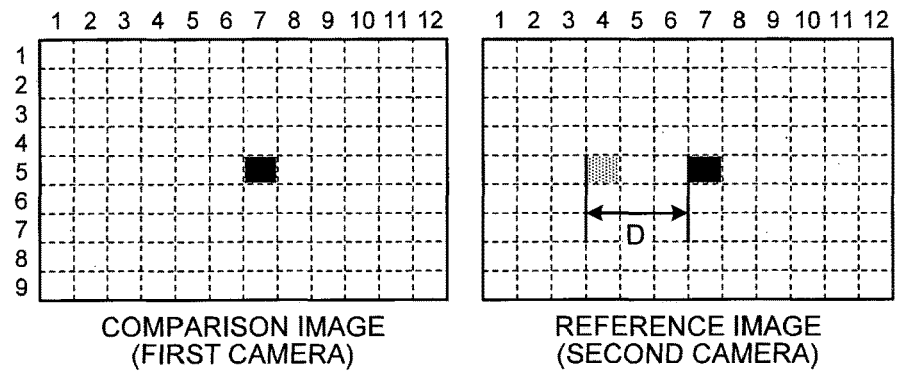
FIG. 3A is a drawing that illustrates an ideal condition for the object image and parallax.

FIG. 3A is a drawing that illustrates an ideal condition for the object image and parallax. An image of the object is positioned at (5, 7) on the comparison image. On the other hand, an image of the object is positioned positioned at (5, 4) on the reference image. Ideal parallax D is thus 3.

Figure 3B:
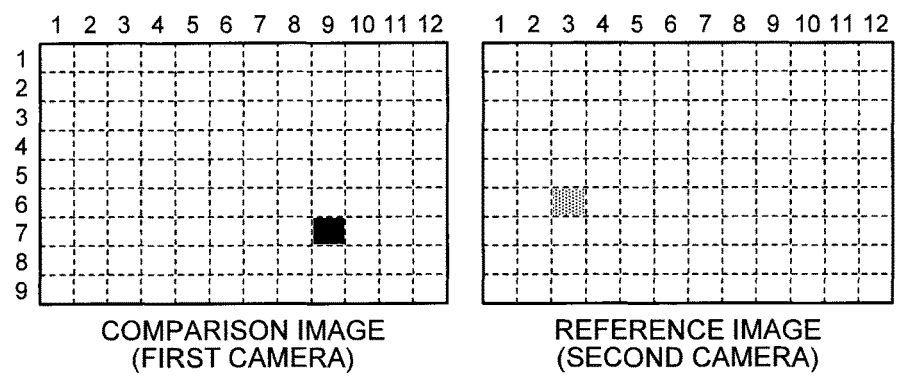
FIG. 3B is a drawing that illustrates an absolute positional deviation in the object image due to light refracted by a windshield.

FIG. 3B is a drawing that illustrates an absolute positional deviation in the object image due to the effect of light refraction by a windshield. The object image is positioned at (7, 9) on the comparison image. The deviation amount from the ideal condition is thus 2 in the vertical direction and 2 in the horizontal direction. The object image is positioned at (6, 3) on the reference image. The deviation amount from the ideal condition is thus 1 in the vertical direction and 1 in the horizontal direction.

Figure 3C:
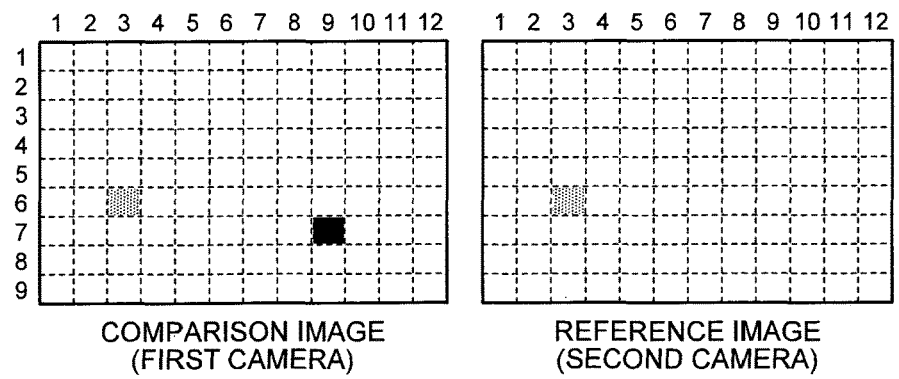
FIG. 3C is a drawing that illustrates the case where parallax is calculated based on the position of the image on a reference image in FIG. 3B.

FIG. 3C is a drawing that illustrates the case where the parallax is calculated based on the position of the image on the reference image in FIG. 3B. On the comparison image, an image serving as a reference is positioned at (6, 3), that is, at the same position as the position of the image on the reference image. The parallax in FIG. 3C is 1 in the vertical direction and 6 in the horizontal direction, which means that the absolute positional deviation in the object image causes a deviation (a relative positional deviation) of 1 in the vertical direction and 3 in the horizontal direction from the ideal parallax.

Figure 3D:
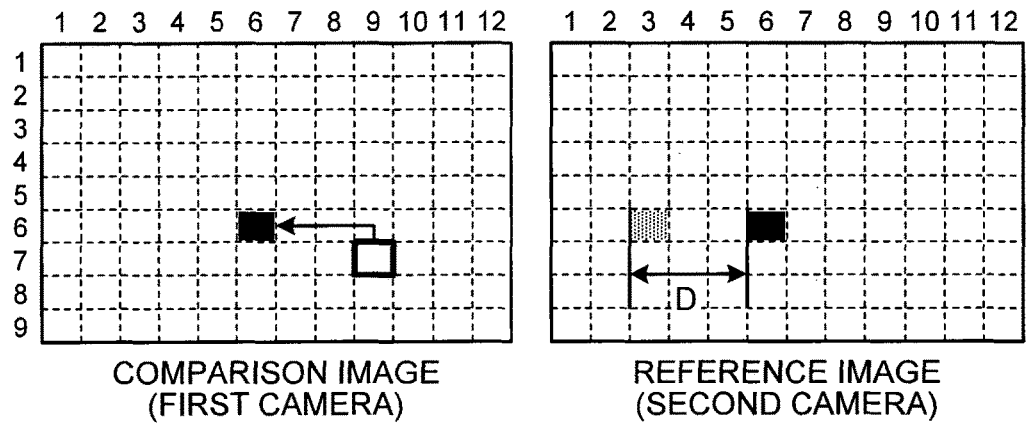
FIG. 3D is a drawing that illustrates the case where a comparison image is calibrated such that the parallax coincides with ideal parallax D.

FIG. 3D is a drawing that illustrates the case where the comparison image is calibrated in such a manner that the parallax coincides with the ideal parallax D. The ideal parallax D is calculated by using a calibration chart located at a known distance and photographed by a stereo camera. In conventional stereo camera calibration methods, the position (6, 3) of the image on the reference image, which includes the calibration chart located at a known distance as a photographic object, is set as a reference, and the position of the image on the comparison image, which includes the calibration chart located at a known distance as a photographic object, is calibrated in such a manner that the parallax comes to 3 (the ideal parallax D). In other words, those conventional stereo camera calibration methods calibrate the comparison image in such a manner that the position of the image on the comparison image is moved from (7, 9) to (6, 6). With this calibration, the ideal parallax D is calculated based on the comparison image and the reference image.

Figure 3E:
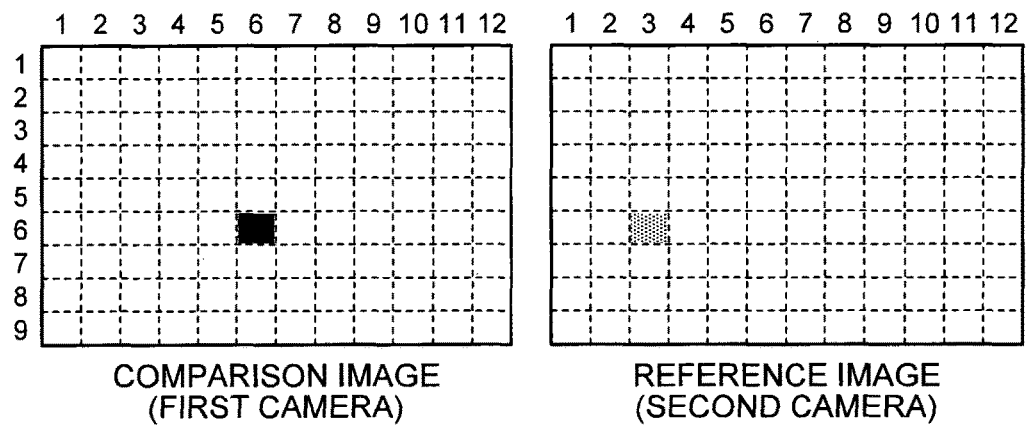
FIG. 3E is a drawing that illustrates a state where the absolute positional deviation in the object image is not calibrated.

FIG. 3E is a drawing that illustrates a state where the absolute positional deviation in the object image is not calibrated. The position (6, 6) of the image on the comparison image remains different from the position (5, 7) in the ideal condition by 1 in the vertical direction and 1 in the horizontal direction. The position (6, 3) of the image on the reference image also remains different from the position (5, 4) in the ideal condition by 1 in the vertical direction and 1 in the horizontal direction. The results indicate that the position of the object image cannot be calibrated to the correct position even if image data is calibrated by using a pair of image data so that the ideal parallax D is achieved.

With the following calibration method in the first embodiment, however, the position of the object image is substantially calibrated to the position in the ideal condition.

The calibration method in the first embodiment uses photographic images (a comparison image and a reference image) obtained by photographing a calibration chart without a windshield 15 and photographic images (a comparison image and a reference image) obtained by photographing a calibration chart with the windshield 15. A comparison image photographed without a windshield is referred to as a first comparison image, and a reference image photographed without a windshield is referred to as a first reference image. A comparison image photographed with a windshield is referred to as a second comparison image, and a reference image photographed with a windshield is referred to as a second reference image.

Figure 4:
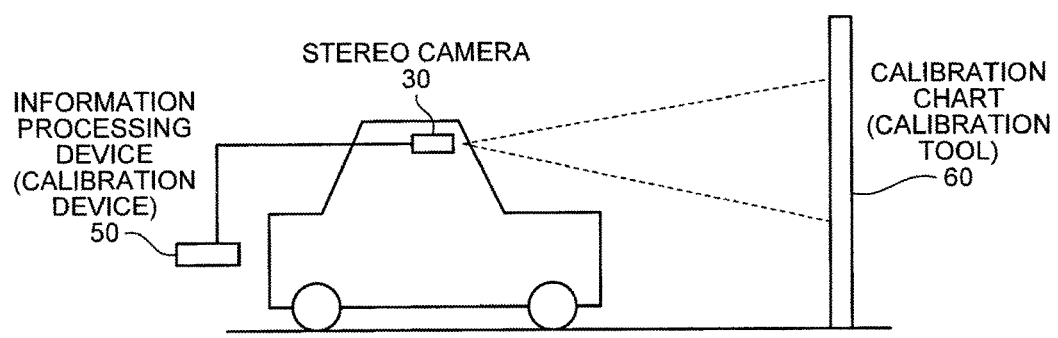
FIG. 4 is a drawing that illustrates an example of an environment (without a windshield) where a calibration method in a first embodiment is implemented.

FIG. 4 is a drawing that illustrates an example of an environment (without the windshield 15) where the calibration method in the first embodiment is implemented. A calibration chart 60 (a calibration tool) is installed within a photographic range of a stereo camera 30. The calibration chart 60 has a pattern or the like that facilitates detection of a corresponding point on the reference image that corresponds to a point on the comparison image.

Figure 5:
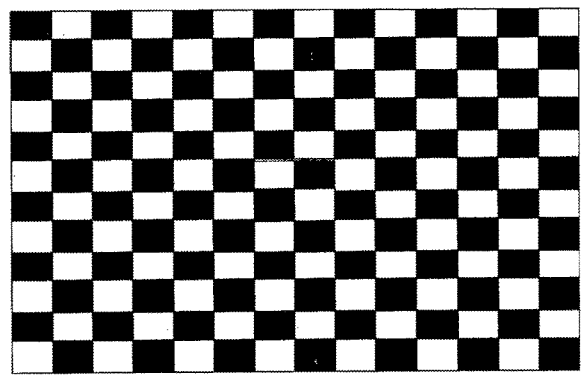
FIG. 5 is a drawing that illustrates an example of a pattern of a calibration chart.
Figure 5:
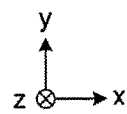

FIG. 5 is a drawing that illustrates an example of a pattern of the calibration chart 60. FIG. 5 illustrates a checkered pattern as a pattern of the calibration chart 60. In FIG. 5, a smaller pitch between checks on the checkered pattern generates more characteristic points (corresponding points), and these points enable an information processing device 50 described later to correctly detect a local absolute positional deviation resulting from the windshield 15. However, because such a small pitch is likely to cause a detection error of a corresponding point in corresponding point detecting processing described later, an irregular fine pattern may be used when a pitch between lattice points is reduced. Use of a fine pattern, however, increases the amount of information handled by the information processing device 50 and thus increases load on processing performed by the information processing device 50. It is preferable that the calibration chart 60 be large enough to be imaged on the whole of a photographic image. The calibration chart 60 in such a large size enables the information processing device 50 to use information of the characteristic points (corresponding points) existing over the whole area of the photographic image and thus to correctly obtain an absolute positional deviation resulting from the windshield 15. Any shape of a pattern other than a checkered pattern is applicable to the calibration chart 60. Examples of the pattern of the calibration chart 60 may include a circular pattern.

Returning to FIG. 4, the stereo camera 30 photographs the calibration chart 60 without a windshield and acquires the first comparison image and the first reference image. The first comparison image is photographed by the first camera 1 (see FIG. 1), and the first reference image is photographed by the second camera 2 (see FIG. 1). The first comparison image and the first reference image are input into the information processing device 50 serving as a calibration device.

Figure 6:
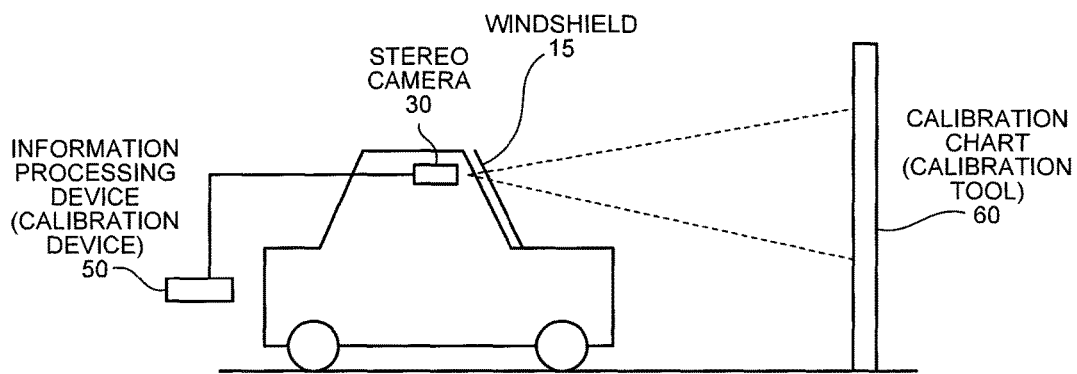
FIG. 6 is a drawing that illustrates an example of an environment (with a windshield) where the calibration method in the first embodiment is implemented.

FIG. 6 is a drawing that illustrates an example of an environment (with the windshield 15) where the calibration method in the first embodiment is implemented. The implementation environment in FIG. 6 is the case where the vehicle in the implementation environment in FIG. 4 is equipped with the windshield 15. The implementation environments of FIG. 4 and FIG. 6 differ from each other only in whether to include the windshield 15. The stereo camera 30 photographs the calibration chart 60 with the windshield 15 and acquires the second comparison image and the second reference image. The second comparison image and the second reference image are input into the information processing device 50 serving as a calibration device.

The information processing device 50 uses the first comparison image and the second comparison image to determine a correction parameter for calibrating an absolute positional deviation in the first camera 1 of the stereo camera 30 and uses the first reference image and the second reference image to determine a correction parameter for calibrating an absolute positional deviation in the second camera 2 of the stereo camera 30.

Figure 7:
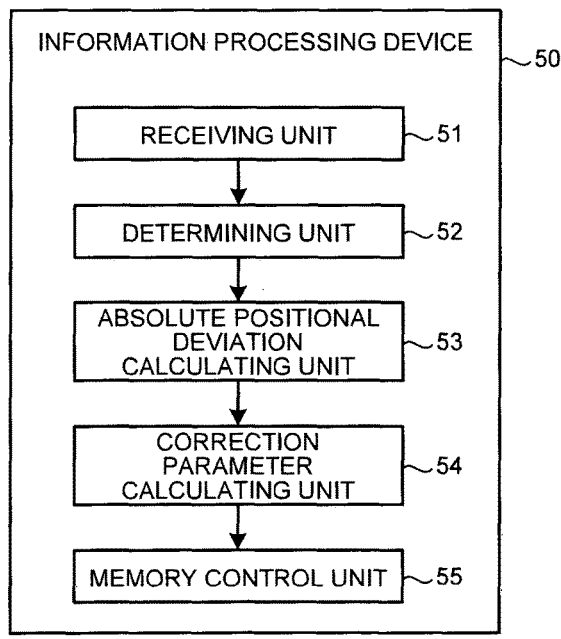
FIG. 7 is a drawing that illustrates an example of the configuration of an information processing device in the first embodiment.

FIG. 7 is a drawing that illustrates an example of the configuration of the information processing device 50 in the first embodiment. The information processing device 50 in the first embodiment includes a receiving unit 51, a determining unit 52, an absolute positional deviation calculating unit 53, a correction parameter calculating unit 54, and a memory control unit 55.

The receiving unit 51 receives, from the stereo camera 30, first photographic images (the first comparison image and the first reference image) obtained by photographing the calibration chart 60 without interposing the windshield 15. The receiving unit 51 inputs the first photographic images (the first comparison image and the first reference image) into the determining unit 52. The receiving unit 51 furthermore receives, from the stereo camera 30, second photographic images (the second comparison image and the second reference image) obtained by photographing the calibration chart 60 through the windshield 15. The receiving unit 51 inputs the second photographic images (the second comparison image and the second reference image) into the determining unit 52.

The determining unit 52 receives the first photographic images (the first comparison image and the first reference image) from the receiving unit 51. The determining unit 52 determines whether the first photographic images are reliable. The determining unit 52, for example, extracts white luminance of the image of the pattern of the calibration chart 60 included in the first photographic images. Uneven luminance on the image of the pattern on the calibration chart 60 affects accuracy in the corresponding point detecting processing described later. The determining unit 52 thus determines whether uneven luminance markedly appears over the whole areas of the first photographic images. If, for example, uneven luminance does not markedly appear over the whole areas of the first photographic images, the determining unit 52 determines that the first photographic images are reliable. When the first photographic images are determined to be reliable, the determining unit 52 inputs the first photographic images into the absolute positional deviation calculating unit 53.

The determining unit 52 similarly receives second photographic images (the second comparison image and the second reference image) from the receiving unit 51. The determining unit 52 determines whether the second photographic images are reliable. The determining unit 52, for example, determines whether differences of luminance on the second photographic images are normal and specifies a case where dust adheres to the windshield 15 and the like. Dust and the like adhering to the windshield 15 affect accuracy in the corresponding point detecting processing described later. If, for example, differences of luminance on the second photographic images are normal, the second photographic images are determined to be reliable. When the second photographic images are determined to be reliable, the determining unit 52 inputs the second photographic images into the absolute positional deviation calculating unit 53.

The absolute positional deviation calculating unit 53 receives the first photographic images (the first comparison image and the first reference image) and the second photographic images (the second comparison image and the second reference image) from the determining unit 52. The absolute positional deviation calculating unit 53 calculates an absolute positional deviation in the first camera 1 and an absolute positional deviation in the second camera 2. The same method is employed to calculate the absolute positional deviations of the first camera 1 and the second camera 2, and thus described in the following is a method for calculating an absolute positional deviation in the first camera 1 using the first comparison image and the second comparison image.

The absolute positional deviation calculating unit 53 calculates an absolute positional deviation (a deviation in coordinates of an object image due to the windshield 15) based on the coordinates of the image of the calibration chart 60 on the first comparison image and the coordinates of the image of the calibration chart 60 on the second comparison image. Specifically, the absolute positional deviation calculating unit 53 retrieves respective characteristic points (corresponding points) on the second comparison image corresponding to characteristic points on the first comparison image in the two dimensional directions, the x direction and the y direction (corresponding point retrieving processing). The absolute positional deviation calculating unit 53 determines those characteristic points by using the image of a pattern on the calibration chart 60. The absolute positional deviation calculating unit 53 calculates a deviation in coordinates ($\Delta x$, $\Delta y$) between the coordinates (x1, y1) of a characteristic point on the first comparison image and the coordinates (x2, y2) of a characteristic point (a corresponding point), which corresponds to the characteristic point on the first comparison image, on the second comparison image as an absolute positional deviation in the vicinity of the characteristic point in the first camera 1. The absolute positional deviation calculating unit 53 inputs the absolute positional deviation in the first camera 1 into the correction parameter calculating unit 54.

The absolute positional deviation calculating unit 53 calculates an absolute positional deviation in the second camera 2 in the manner similar to that for calculating the absolute positional deviation in the first camera 1 and inputs the absolute positional deviation in the second camera 2 into the correction parameter calculating unit 54.

The correction parameter calculating unit 54 receives the absolute positional deviation in the first camera 1 and the absolute positional deviation in the second camera 2 from the absolute positional deviation calculating unit 53. The correction parameter calculating unit 54 calculates a first correction parameter for calibrating the absolute positional deviation in the first camera 1 and a second correction parameter for calibrating the absolute positional deviation in the second camera 2. Examples of the first correction parameter and the second correction parameter include a coefficient used in a correction formula for transforming coordinates in such a manner that an absolute positional deviation is cancelled. For example, when the absolute positional deviation is indicated as (1, 2), the correction formula transforms the coordinates by −1 in the x direction and −2 in the y direction. The correction parameter calculating unit 54 inputs the first correction parameter and the second correction parameter into the memory control unit 55.

The memory control unit 55 receives the first correction parameter and the second correction parameter from the correction parameter calculating unit 54. The memory control unit 55 stores the first correction parameter and the second correction parameter in the stereo camera 30. The memory control unit 55 stores the first correction parameter and the second correction parameter in the stereo camera 30 by, for example, transmitting the first correction parameter and the second correction parameter to the stereo camera 30 by wired or wireless communication. The first correction parameter and the second correction parameter may be once stored in an attachable and detachable memory medium or the like and stored in the stereo camera 30 through the memory medium.

Figure 8:
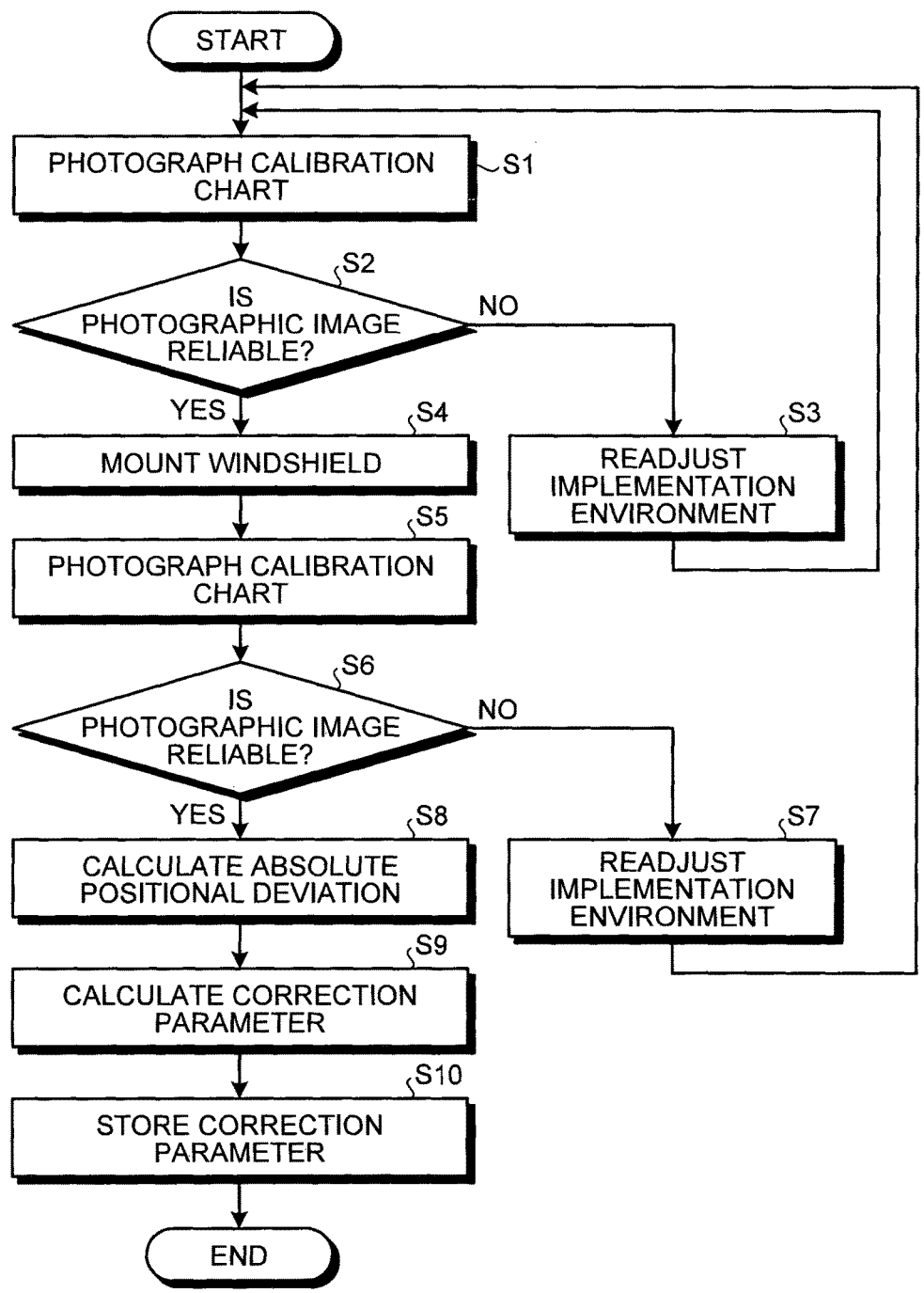
FIG. 8 is a flowchart that illustrates an example of the calibration method in the first embodiment.

A calibration method in the first embodiment will now be described. FIG. 8 is a flowchart that illustrates an example of the calibration method in the first embodiment. The stereo camera 30 photographs the calibration chart 60 without the windshield 15 (see FIG. 4) and acquires the first photographic images (the first comparison image and the first reference image) (Step S1). The information processing device 50 (the determining unit 52) determines whether the first photographic images acquired at Step S1 are reliable (Step S2). The information processing device 50 determines reliability of the first photographic images, for example, based on whether uneven luminance markedly appears over the whole areas of the first photographic images.

When the first photographic image is determined to be unreliable (No at Step S2), the implementation environment is adjusted (Step S3), and the process returns to Step S1. Examples of the adjustment for the implementation environment include adjustments for the position and direction of the calibration chart 60. When the first photographic images are determined to be reliable (Yes at Step S2), the windshield 15 is mounted on the vehicle (Step S4). That is, the environment where the calibration method in the first embodiment is implemented is brought into the state of FIG. 6.

The stereo camera 30 photographs the calibration chart 60 with the windshield 15 mounted (see FIG. 6) and acquires the second photographic images (the second comparison image and the second reference image) (Step S5). The information processing device 50 (the determining unit 52) determines whether the second photographic images acquired at Step S5 are reliable (Step S6). The information processing device 50 determines reliability of the second photographic images, for example, based on whether differences of luminance on the second photographic images are normal.

When the second photographic images are determined to be unreliable (No at Step S6), the implementation environment is adjusted (Step S7), and the process returns to Step S1. Examples of the adjustment for the implementation environment include remounting of the windshield 15. If the adjustment for the implementation environment (Step S7) is minor, the process may restart from Step S4 instead of returning to Step S1.

When the second photographic images are determined to be reliable (Yes at Step S6), the information processing device 50 (the absolute positional deviation calculating unit 53) calculates an absolute positional deviation in the first camera 1 using the above-described method with reference to the first comparison image and the second comparison image and furthermore calculates an absolute positional deviation in the second camera 2 using the above-described method with reference to the first reference image and the second reference image (Step S8).

The information processing device 50 (the correction parameter calculating unit 54) calculates the first correction parameter for calibrating the absolute positional deviation in the first camera 1 and the second correction parameter for calibrating the absolute positional deviation in the second camera 2 (Step S9). Examples of the first correction parameter and the second correction parameter include a coefficient used in a correction formula for transforming coordinates in such a manner that the absolute positional deviation is cancelled.

The information processing device 50 (the memory control unit 55) stores the first correction parameter and the second correction parameter in the stereo camera 30. The memory control unit 55 stores the first correction parameter and the second correction parameter in the stereo camera 30 by, for example, transmitting the first correction parameter and the second correction parameter to the stereo camera 30 by wired or wireless communication (Step S10).

As described above, the calibration method in the first embodiment acquires the first photographic images (the first comparison image and the first reference image) photographed without the windshield 15 and the second photographic images (the second comparison image and the second reference image) photographed with the windshield 15. The calibration method in the first embodiment thereafter calculates the difference between a characteristic point on the first comparison image and a characteristic point (a corresponding point), which corresponds to the characteristic point on the first comparison image, on the second comparison image as an absolute positional deviation in the vicinity of the characteristic point of the first camera 1 and similarly calculates the difference between a characteristic point on the first reference image and a characteristic point (corresponding point), which corresponds to the characteristic point on the first reference image, on the second reference image as an absolute positional deviation in the vicinity of the characteristic point of the second camera 2. Based on the absolute positional deviation in the first camera 1 (the second camera 2) calculated in this manner, the calibration method in the first embodiment calculates the first correction parameter (the second correction parameter). The absolute positional deviation in the first camera 1 (the second camera 2) due to the windshield 15 is therefore accurately calibrated by using the first correction parameter (the second correction parameter).

In the description of the first embodiment, the stereo camera 30 mounted on a vehicle is used as an example of a photographic device to be calibrated, however, the calibration method in the first embodiment can be separately employed for a single camera. Any number of cameras is thus applicable as a photographic device to be calibrated. Examples of the photographic device to be calibrated may include a monocular camera.

Second Embodiment

A second embodiment will now be described. When the stereo camera 30 is used as a photographic device to be calibrated, a relative positional deviation described in FIGS. 3A to 3E occurs due to factors such as an assembly tolerance of the stereo camera 30 mounted on an object. The relative positional deviation resulting from the assembly tolerance and/or the like can be calibrated by firstly correcting the absolute positional deviation in the second comparison image (the second reference image) using the first correction parameter (the second correction parameter) calculated by using the calibration method in the embodiment and secondly updating the first correction parameter of the stereo camera 30 so as to perform calibration described in FIG. 3D. In the second embodiment, a case will be described where an absolute positional deviation and a relative positional deviation in the stereo camera 30 are calibrated.

Figure 9:
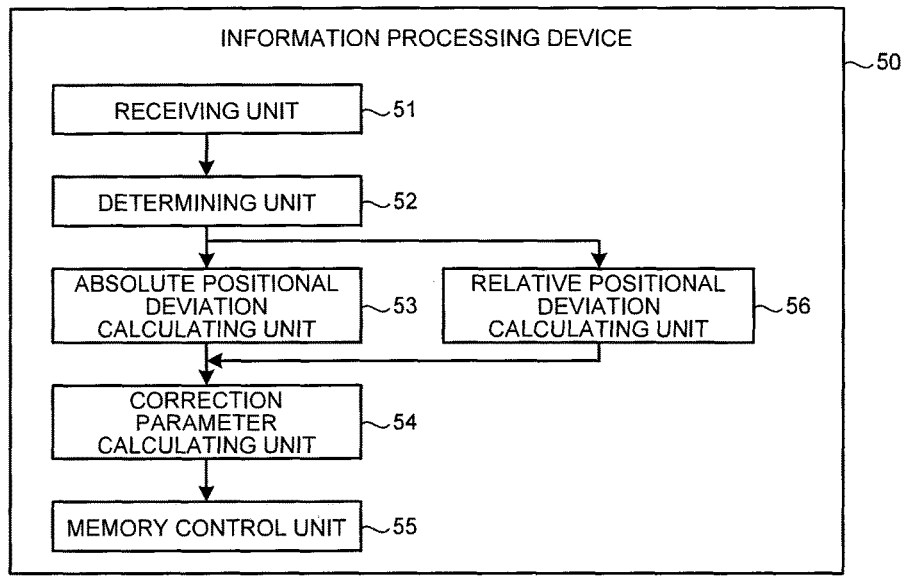
FIG. 9 is a drawing that illustrates an example of the configuration of the information processing device in a second embodiment.

FIG. 9 is a drawing that illustrates an example of the configuration of the information processing device 50 in the second embodiment. The information processing device 50 in the second embodiment includes the receiving unit 51, the determining unit 52, the absolute positional deviation calculating unit 53, the correction parameter calculating unit 54, the memory control unit 55, and a relative positional deviation calculating unit 56. The configuration of the information processing device 50 in the second embodiment additionally includes the relative positional deviation calculating unit 56 compared with the configuration of the information processing device 50 in the first embodiment. The same description as the first embodiment will be omitted from the description of the second embodiment, and processing for calibrating a relative positional deviation occurring due to a factor such as an assembly tolerance of the stereo camera 30 mounted on an object will be described in the second embodiment.

Operation when Using the Absolute Positional Deviation Calculating Unit 53

For calibration of an absolute positional deviation resulting from the windshield 15, the information processing device 50 in the second embodiment calculates the first and the second correction parameters by using the absolute positional deviation calculating unit 53 and the correction parameter calculating unit 54 and stores the parameters in the stereo camera 30 by using the memory control unit 55 (see FIG. 8). The operation of the information processing device 50 when using the absolute positional deviation calculating unit 53 is the same as that in the first embodiment, and the description of the operation is thus omitted.

Operation when Using the Relative Positional Deviation Calculating Unit 56

The information processing device 50 in the second embodiment receives, from the stereo camera 30, a photographic image in which the absolute positional deviation resulting from the windshield 15 has been calibrated and calculates a parameter (a third parameter in the later description) for calibrating a relative positional deviation occurring due to a factor such as an assembly tolerance of the stereo camera 30 by using the relative positional deviation calculating unit 56 and the correction parameter calculating unit 54. The following is a description about an operation of the information processing device 50 when using the relative positional deviation calculating unit 56.

The receiving unit 51 receives, from the stereo camera 30, the second comparison image (a comparison image including the calibration chart 60 photographed by the first camera 1 through the windshield 15) in which the absolute positional deviation has been calibrated by using the first correction parameter and the second reference image (a reference image including the calibration chart 60 photographed by the second camera 2 through the windshield 15) in which the absolute positional deviation has been calibrated by using the second correction parameter.

The determining unit 52 determines whether the second comparison image (the second reference image) in which the absolute positional deviation has been calibrated by using the first correction parameter (the second correction parameter) is reliable. The method for determining reliability is the same as that of the first embodiment, and the description of the method is thus omitted. If the second comparison image (the second reference image) is determined to be reliable, the determining unit 52 inputs the second comparison image (the second reference image) into the relative positional deviation calculating unit 56.

The relative positional deviation calculating unit 56 calculates parallax (Dx, Dy) by retrieving respective characteristic points (corresponding points) on the second reference image that correspond to characteristic points on the second comparison image. The relative positional deviation calculating unit 56 thereafter calculates the difference between the parallax (Dx, Dy) and ideal parallax (D, 0) as a relative positional deviation and inputs the relative positional deviation into the correction parameter calculating unit 54.

The correction parameter calculating unit 54 calculates the third correction parameter for calibrating a relative positional deviation between the second comparison image and the second reference image. Calibration using the third correction parameter is performed on the second comparison image (see FIG. 3D). Examples of the third correction parameter include a coefficient used in a correction formula for transforming coordinates on the second comparison image in such a manner that the relative positional deviation is cancelled. The correction parameter calculating unit 54 modifies the first correction parameter by combining the first correction parameter for calibrating an absolute positional deviation with the third correction parameter and works out a modified first correction parameter. The correction parameter calculating unit 54 inputs the modified first correction parameter into the memory control unit 55.

The memory control unit 55 stores the modified first correction parameter in the stereo camera 30, thereby updating the first correction parameter stored in the stereo camera 30.

Figure 10:
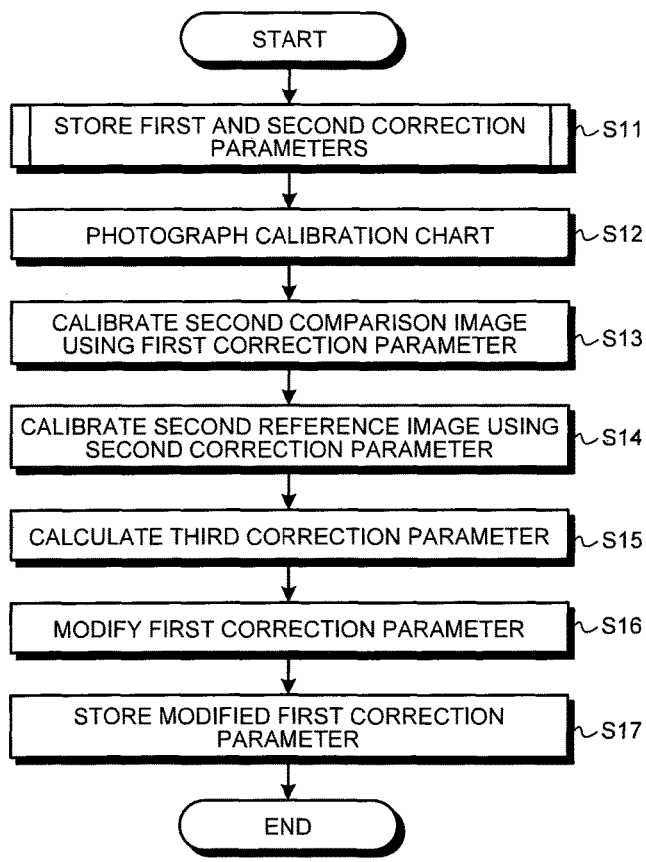
FIG. 10 is a flowchart that illustrates an example of the calibration method in the second embodiment.

A calibration method in the second embodiment will now be described. FIG. 10 is a flowchart that illustrates an example of the calibration method in the second embodiment. The information processing device 50 stores the first correction parameter and the second correction parameter calculated by using the calibration method in the first embodiment (see Step S1 to Step S10 in FIG. 8) in the stereo camera 30 (Step S11).

The stereo camera 30 photographs the calibration chart 60 serving as an object through the windshield 15 and acquires the second comparison image and the second reference image (Step S12). The stereo camera 30 calibrates the second comparison image using the first correction parameter (Step S13). The stereo camera 30 furthermore calibrates the second reference image using the second correction parameter (Step S14).

Based on the difference between the coordinates of the object image on the calibrated second comparison image and the coordinates of the object image on the calibrated second reference image and the ideal parallax D, the information processing device 50 calculates the third correction parameter for calibrating a relative positional deviation indicating a deviation in a parallax between the object image on the calibrated second comparison image and the object image on the calibrated second reference image (Step S15). The information processing device 50 modifies the first correction parameter using the third correction parameter, thereby calculating the modified first correction parameter (Step S16). The stereo camera 30 stores therein the modified first correction parameter (Step S17).

As described above, the calibration method in the second embodiment provides further modifications to the first correction parameter of the stereo camera 30, thereby acquiring three dimensional information indicating a more accurate position of the object from the object image included in the photographic image photographed by the stereo camera 30.

In the above description, the information processing device 50 modifies the first correction parameter using the third correction parameter. In another case, the information processing device 50 may modify the second correction parameter using the third correction parameter.

Third Embodiment

Figure 11:
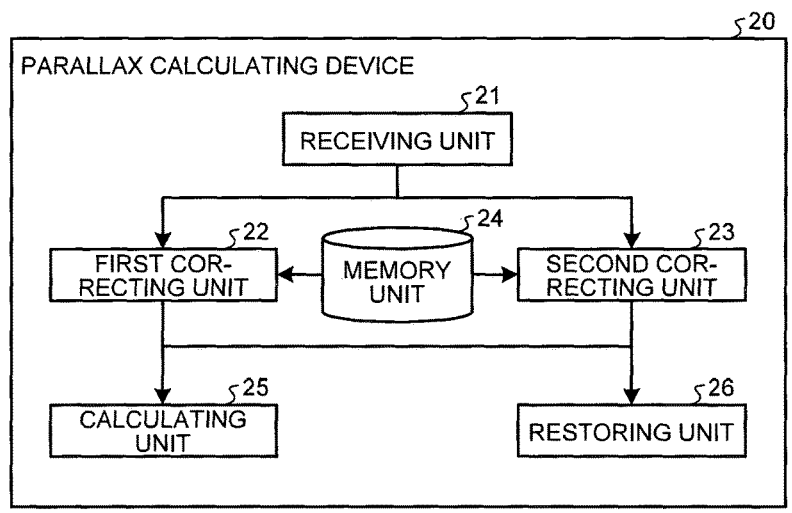
FIG. 11 is a drawing that illustrates an example of the configuration of a parallax calculating device in a third embodiment.

A third embodiment will now be described. The third embodiment relates to a parallax calculating device storing therein a correction parameter calculated by using the calibration method in the second embodiment. When the parallax calculating device in operation uses a correction parameter, the word "correction" is used instead of "calibration". FIG. 11 is a drawing that illustrates an example of the configuration of a parallax calculating device 20 in the third embodiment. The parallax calculating device 20 in the third embodiment includes a receiving unit 21, a first correcting unit 22, a second correcting unit 23, a memory unit 24, a calculating unit 25, and a restoring unit 26.

The receiving unit 21 receives an input of the second comparison image (a comparison image photographed through a transparent body) and outputs the second comparison image to the first correcting unit 22. The receiving unit 21 receives an input of the second reference image (a reference image photographed through a transparent body) and outputs the second reference image to the second correcting unit 23.

The first correcting unit 22 receives the second comparison image from the receiving unit 21, corrects the second comparison image using the modified first correction parameter in the above description, and outputs the corrected second comparison image to the calculating unit 25 and the restoring unit 26.

The second correcting unit 23 receives the second reference image from the receiving unit 21, corrects the second reference image using the second correction parameter in the above description, and outputs the corrected second reference image to the calculating unit 25 and the restoring unit 26.

The memory unit 24 stores therein the modified first correction parameter used by the first correcting unit 22 and the second correction parameter used by the second correcting unit 23.

The calculating unit 25 receives the corrected second comparison image from the first correcting unit 22 and receives the corrected second reference image from the second correcting unit 23. The calculating unit 25 calculates the parallax based on the object image included in the corrected second comparison image and the object image included in the corrected second reference image. The calculating unit 25 calculates the parallax for each pixel and generates a parallax image indicating the parallaxes by density values.

The restoring unit 26 receives the corrected second comparison image from the first correcting unit 22 and receives the corrected second reference image from the second correcting unit 23. The restoring unit 26 restores the modulation transfer function (MTF) characteristics of the second comparison image, which has been decreased by the correction. By restoring the MTF characteristics of the second comparison image, the restoring unit 26 generates a luminance image of the first camera 1 with its resolution improved. Similarly, the restoring unit 26 restores the MTF characteristics of the second reference image, which has been decreased by the correction. By restoring the MTF characteristics of the second reference image, the restoring unit 26 generates a luminance image of the second camera 2 with its resolution improved.

Figure 12:
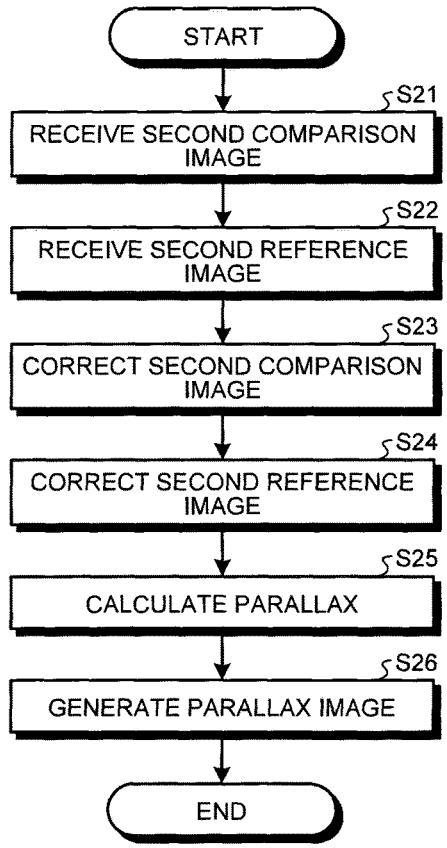
FIG. 12 is a flowchart that illustrates an example of a method for calculating parallax in the third embodiment.

A method for calculating the parallax in the third embodiment will now be described with reference to a flowchart. FIG. 12 is a flowchart that illustrates an example of the method for calculating the parallax in the third embodiment. The receiving unit 21 receives an input of the second comparison image (Step S21) and receives an input of the second reference image (Step S22).

The first correcting unit 22 corrects the second comparison image using the modified first correction parameter (Step S23). The second correcting unit 23 corrects the second reference image using the second correction parameter (Step S24).

The calculating unit 25 calculates parallax based on the object image included in the corrected second comparison image and the object image included in the corrected second reference image (Step S25). The calculating unit 25 generates a parallax image indicating the parallaxes by density values of pixels by using the parallaxes (the parallax calculated for each pixel) calculated at Step S25 (Step S26).

As described above, in the parallax calculating device 20 of the third embodiment, the first correcting unit 22 corrects the second comparison image using the modified first correction parameter, and the second correcting unit 23 corrects the second reference image using the second correction parameter. Furthermore, the calculating unit 25 calculates the parallax based on the object image included in the corrected second comparison image and the object image included in the corrected second reference image.

The parallax calculating device 20 in the third embodiment can correct a deviation in a parallax (a relative positional difference) in an object image on image data due to an assembly tolerance and/or the like in addition to a deviation (an absolute positional deviation) in coordinates of object images on image data due to a transparent body. In other words, the parallax calculating device 20 in the third embodiment can more accurately calculate three dimensional coordinates indicating the position of an object based on the distance to the object calculated from the parallax of the object image and the coordinates of the object image on image data.

Fourth Embodiment

Figure 13:
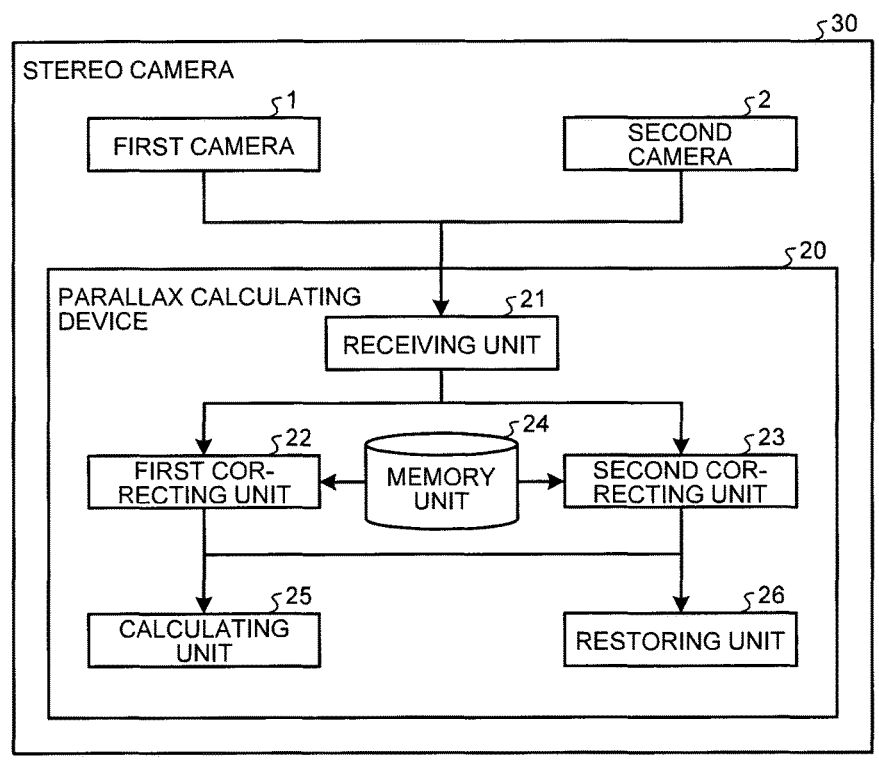
FIG. 13 is a drawing that illustrates an example of the configuration of a stereo camera in a fourth embodiment.

A fourth embodiment will now be described. FIG. 13 is a drawing that illustrates an example of the configuration of the stereo camera 30 in the fourth embodiment. The stereo camera 30 in the fourth embodiment includes the first camera 1, the second camera 2, and the parallax calculating device 20. The parallax calculating device 20 includes the receiving unit 21, the first correcting unit 22, the second correcting unit 23, the memory unit 24, the calculating unit 25, and the restoring unit 26.

Figure 14:
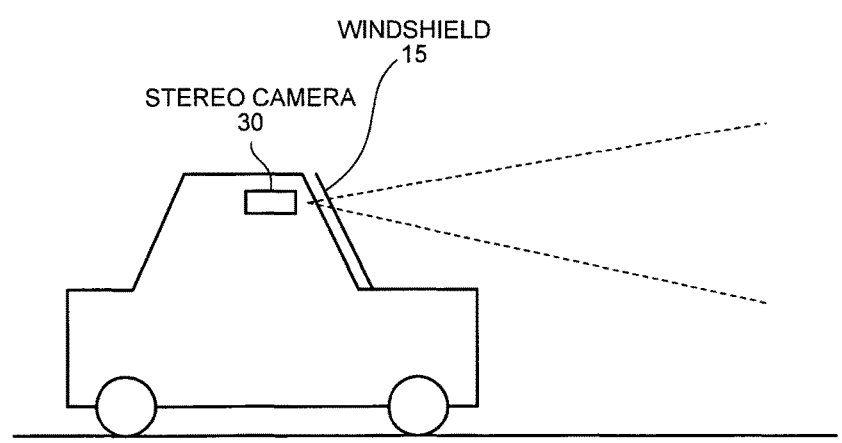
FIG. 14 is a drawing that illustrates an example of using the stereo camera in the fourth embodiment as an in-vehicle stereo camera.

The stereo camera 30 in the fourth embodiment includes the parallax calculating device 20 of the third embodiment. Examples of the application of the stereo camera 30 in the fourth embodiment include an in-vehicle stereo camera. FIG. 14 is a drawing that illustrates an example of using the stereo camera 30 in the fourth embodiment as an in-vehicle stereo camera. The stereo camera 30 is installed inside the windshield 15, and this arrangement makes it possible to correct a deviation (an absolute positional deviation) in coordinates of the object image on image data in addition to a deviation in a parallax (a relative positional deviation) in the object image on image data when the car (vehicle) is running or in a halt condition.

The stereo camera 30 in the fourth embodiment can correct a deviation (an absolute positional deviation) in coordinates of an object image on image data on a real-time basis in addition to a deviation in a parallax (a relative positional deviation) in an object image on image data. In other words, the stereo camera 30 in the fourth embodiment can accurately calculate, on a real-time basis, three dimensional coordinates indicating the position of the object based on the distance to the object calculated from the parallax of the object image and the coordinates of the object image on image data.

Figure 15:
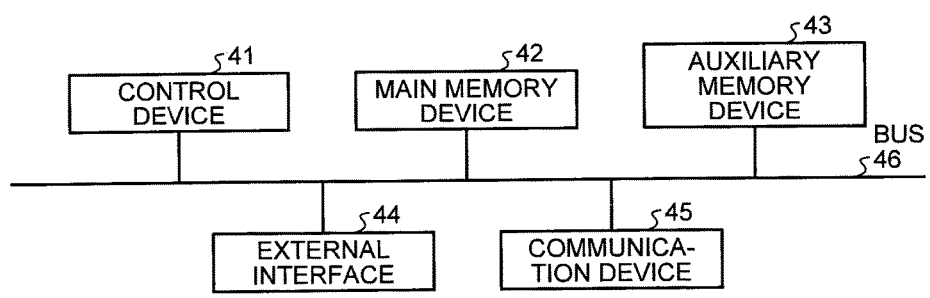
FIG. 15 is a drawing that illustrates an example of the hardware configuration of the information processing device and the parallax calculating device.

The following is a description about an example of the hardware configuration of the information processing device 50 and the parallax calculating device 20. FIG. 15 is a drawing that illustrates an example of the hardware configuration of the information processing device 50 and the parallax calculating device 20. The information processing device 50 and the parallax calculating device 20 include a control device 41, a main memory device 42, an auxiliary memory device 43, an external interface 44, and a communication device 45. The control device 41, the main memory device 42, the auxiliary memory device 43, the external interface 44, and the communication device 45 are connected with one another via a bus 46.

The control device 41 executes a computer program read out on the main memory device 42 from the auxiliary memory device 43. Examples of the main memory device 42 include a read only memory (ROM) and a random access memory (RAM). Examples of the auxiliary memory device 43 include a hard disk drive (HDD) and a memory card. The external interface 44 is an interface for transmitting and receiving data to and from other devices. The communication device 45 is an interface for communicating with other devices by wireless communication and/or the like.

A computer program executed by the information processing device 50 and the parallax calculating device 20 is stored in a computer-readable memory medium such as a compact disc read only memory (CD-ROM), a memory card, a compact disc recordable (CD-R), and a digital versatile disc (DVD) as an installable or executable file and provided as a computer program product.

The program executed by the information processing device 50 and the parallax calculating device 20 may be stored in a computer connected to a network such as the Internet and provided by being downloaded via the network. The program executed by the information processing device 50 and the parallax calculating device 20 may be provided via a network such as the Internet without being downloaded.

The program executed by the information processing device 50 and the parallax calculating device 20 may be preliminarily embedded in a read only memory (ROM) or the like and provided.

The program executed by the information processing device 50 consists of modules including the above-described functional blocks (the receiving unit 51, the determining unit 52, the absolute positional deviation calculating unit 53, the correction parameter calculating unit 54, the memory control unit 55, and the relative positional deviation calculating unit 56). As an actual hardware configuration, the control device 41 reads out the program from a memory medium and executes the program, whereby each of the functional blocks loads on the main memory device 42. In other words, each of the functional blocks is generated on the main memory device 42.

The program executed by the parallax calculating device 20 consists of modules including the above-described functional blocks (the receiving unit 21, the first correcting unit 22, the second correcting unit 23, the calculating unit 25, and the restoring unit 26). As an actual hardware configuration, the control device 41 reads out the program from a memory medium and executes the program, whereby each of the functional blocks loads on the main memory device 42. In other words, each of the functional blocks is generated on the main memory device 42.

Some or all of the above-described functional blocks (the receiving unit 51, the determining unit 52, the absolute positional deviation calculating unit 53, the correction parameter calculating unit 54, the memory control unit 55, and the relative positional deviation calculating unit 56) included in the information processing device 50 and some or all of the above-described functional blocks (the receiving unit 21, the first correcting unit 22, the second correcting unit 23, the calculating unit 25, and the restoring unit 26) included in the parallax calculating device 20 may be implemented in hardware such as an integrated circuit (IC) instead of being implemented in software.

An embodiment provides the effect that an absolute positional deviation in image data due to a transparent body can be accurately calibrated.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

REFERENCE SIGNS LIST 1 first camera
2 second camera
11 lens (optical system)
12 sensor
13 object
14 optical axis
15 windshield
20 parallax calculating device
21 receiving unit
22 first correcting unit
23 second correcting unit
24 memory unit
25 calculating unit
26 restoring unit
30 stereo camera
41 control device
42 main memory device
43 auxiliary memory device
44 external interface
45 communication device
46 bus
50 information processing device (calibration device)
51 receiving unit
52 determining unit
53 absolute positional deviation calculating unit
54 correction parameter calculating unit
55 memory control unit
56 relative positional deviation calculating unit
60 calibration chart (calibration tool)

The invention claimed is:

1. A calibration method for a stereo camera including a first camera and a second camera located in a position apart from the first camera by a predetermined distance, and configured to calculate distance information, the calibration method comprising:

calculating a first correction parameter based on a photographic image acquired by photographing an object with the first camera without interposing a first transparent body, and a photographic image acquired by photographing the object through the first transparent body with the first camera;

calculating a second correction parameter based on a photographic image acquired by photographing the object with the second camera without interposing the first transparent body, and a photographic image acquired by photographing the object through the first transparent body with the second camera, in a state where a positional relation between the first camera and the first transparent body is the same as in calculating the first correction parameter, and the first camera and the second camera are apart from each other by the predetermined distance; and calculating a third correction parameter for correcting a relative positional deviation in a parallax, the relative positional deviation affecting calculation of the distance information, in a state where the first camera and the second camera are apart from each other by the predetermined distance, based on a first corrected image obtained by correcting, with the first correction parameter, a photographic image acquired by photographing an object through a second transparent body with the first camera, and a second corrected image obtained by correcting, with the second correction parameter, a photographic image acquired by photographing the object through the second transparent body with the second camera.

2. The calibration method according to claim 1, wherein the calculating the first correction parameter includes calculating an absolute positional deviation that indicates a deviation in coordinates of an image of the object due to the first transparent body in the first camera, based on coordinates of an image of the object on a photographic image acquired by photographing through the first transparent body with the first camera and coordinates of an image of the object on a photographic image acquired by photographing with the first camera without interposing the first transparent body, and the calculating the second correction parameter includes calculating an absolute positional deviation that indicates a deviation in coordinates of an image of the object due to the first transparent body in the second camera, based on coordinates of an image of the object on a photographic image acquired by photographing through the first transparent body with the second camera and coordinates of an image of the object on a photographic image acquired by photographing with the second camera without interposing the first transparent body.

3. The calibration method according to claim 1, further comprising updating the first correction parameter based on the third correction parameter.

4. The calibration method according to claim 1, wherein the second transparent body is a windshield of a vehicle.

5. The calibration method according to claim 1, wherein the object photographed at the calculating the first correction parameter and the object photographed at the calculating the second correction parameter are a calibration tool that has a pattern for facilitating detection of coordinates on a photographic image photographed by the second camera that correspond to coordinates on a photographic image photographed by the first camera.

6. The method of claim 1, further comprising storing the third correction parameter, and correcting an acquired image using the third correction parameter.

7. The method of claim 1, wherein the first transparent body is different from the second transparent body.

8. A calibration system for calibrating a stereo camera including a first camera and a second camera located in a position apart from the first camera by a predetermined distance, and configured to calculate distance information, the calibration system comprising:

processing circuitry configured to:
calculate a first correction parameter based on a photographic image acquired by photographing an object with the first camera without interposing a first transparent body, and a photographic image acquired by photographing the object through the first transparent body with the first camera;

calculate a second correction parameter based on a photographic image acquired by photographing the object with the second camera without interposing the first transparent body, and a photographic image acquired by photographing the object through the first transparent body with the second camera, in a state where a positional relation between the first camera and the first transparent body is the same as in calculating the first correction parameter, and the first camera and the second camera are apart from each other by the predetermined distance; and calculate a third correction parameter for correcting a relative positional deviation in a parallax, the relative positional deviation affecting calculation of the distance information, in a state where the first camera and the second camera are apart from each other by the predetermined distance, based on a first corrected image obtained by correcting, with the first correction parameter, a photographic image acquired by photographing an object through a second transparent body with the first camera, and a second corrected image obtained by correcting, with the second correction parameter, a photographic image acquired by photographing the object through the second transparent body with the second camera.

9. A non-transitory computer-readable medium storing a program that causes a computer for calibrating a stereo camera including a first camera and a second camera located in a position apart from the first camera by a predetermined distance, and configured to calculate distance information, to perform a method comprising:

calculating a first correction parameter based on a photographic image acquired by photographing an object with the first camera without interposing a first transparent body, and a photographic image acquired by photographing the object through the first transparent body with the first camera;

calculating a second correction parameter based on a photographic image acquired by photographing the object with the second camera without interposing the first transparent body, and a photographic image acquired by photographing the object through the first transparent body with the second camera, in a state where a positional relation between the first camera and the first transparent body is the same as in calculating the first correction parameter, and the first camera and the second camera are apart from each other by the predetermined distance; and calculating a third correction parameter for correcting a relative positional deviation in a parallax, the relative positional deviation affecting calculation of the distance information, in a state where the first camera and the second camera are apart from each other by the predetermined distance, based on a first corrected image obtained by correcting, with the first correction parameter, a photographic image acquired by photographing an object through a second transparent body with the first camera, and a second corrected image obtained by correcting, with the second correction parameter, a photographic image acquired by photographing the object through the second transparent body with the second camera.

* * * * *